United States Patent [19]

Van Hook

[11] Patent Number: 4,668,494
[45] Date of Patent: May 26, 1987

[54] METHOD OF USING SOLAR ENERGY IN A CHEMICAL SYNTHESIS PROCESS

[75] Inventor: James P. Van Hook, Basking Ridge, N.J.

[73] Assignee: Foster Wheeler Energy Corporation, Livingston, N.J.

[21] Appl. No.: 685,635

[22] Filed: Dec. 24, 1984

[51] Int. Cl.$^4$ .......................... C01B 21/38; C01C 1/02
[52] U.S. Cl. .................... 423/392; 252/373; 252/376; 423/359; 423/659
[58] Field of Search .......... 48/214 A, 214 R, DIG. 9, 48/77, 202, 210; 126/435; 165/DIG. 17; 585/912; 252/373, 376; 423/659, 403, 359, 392

[56] References Cited

U.S. PATENT DOCUMENTS

| | | | |
|---|---|---|---|
| 3,252,773 | 5/1966 | Solomon et al. | 48/202 |
| 3,432,265 | 4/1967 | McCallister et al. | 23/197 |
| 3,442,613 | 6/1978 | Grotz, Jr. | 204/80 |
| 3,584,998 | 7/1968 | Green | 23/199 |
| 3,967,591 | 7/1976 | Iida | 122/32 |
| 3,993,458 | 11/1976 | Antal, Jr. | 48/209 |
| 3,998,205 | 12/1976 | Scragg et al. | 126/271 |
| 4,052,001 | 10/1977 | Vogt | 237/1 A |
| 4,094,751 | 6/1978 | Nozik | 204/80 |
| 4,143,814 | 3/1979 | Hill, Jr. | 237/1 A |
| 4,146,057 | 3/1979 | Friedman et al. | 60/648 |
| 4,161,657 | 7/1979 | Shaffer, Jr. | 204/1 |
| 4,224,298 | 9/1980 | Robinson | 423/359 |
| 4,253,446 | 3/1981 | Muller | 126/435 |
| 4,257,397 | 3/1981 | Gouyou-Beauchamps | 126/427 |
| 4,305,382 | 12/1981 | Nott | 126/433 |
| 4,314,547 | 2/1982 | Walsh | 126/428 |
| 4,328,009 | 5/1982 | Fischer et al. | 48/202 |
| 4,338,922 | 7/1982 | Moore | 126/452 |
| 4,341,202 | 5/1982 | French | 126/433 |
| 4,415,339 | 11/1983 | Aiman et al. | 48/62 |
| 4,421,734 | 12/1983 | Naman | 423/648 |

FOREIGN PATENT DOCUMENTS 2808464  9/1978  Fed. Rep. of Germany ... 165/DIG. 17

OTHER PUBLICATIONS

D. W. Gregg et al., "Solar Coal Gasification", 1980, Solar Energy, Vol. 24, pp. 313–321.

Primary Examiner—Jan H. Silbaugh
Assistant Examiner—Karen D. Kutach
Attorney, Agent, or Firm—Marvin A. Naigur; John E. Wilson; Robert D. Bajefsky

[57] ABSTRACT

A method of using solar energy in a chemical synthesis process comprising steam reforming hydrocarbons or gasifying carbonaceous fuel, converting the product of the steam reforming of hydrocarbons or the gasifying of carbonaceous fuels to an ammonia synthesis gas, converting the ammonia synthesis gas to ammonia, supplying the heat required for the steam reforming of hydrocarbons or the gasifying of carbonaceous fuels by a heat transfer fluid, heating the heat transfer fluid in a solar receiver when solar energy is available, heating the heat transfer fluid by combusting a portion of the ammonia when sufficient solar energy is not available to supply the necessary heat to the heat transfer fluid.

7 Claims, 6 Drawing Figures

AMONIA BURNER

METHOD OF USING SOLAR ENERGY IN A CHEMICAL SYNTHESIS PROCESS

This invention relates to processes that use solar energy directly and indirectly by storing solar energy in the form of ammonia as the source of process heat for producing ammonia and nitric acid. More particularly, the invention relates to processes that combine hydrocarbon steam reforming or carbonaceous fuel gasification and ammonia combustion reactions in a manner that permits continuous operation using solar energy as the source of process heat.

BACKGROUND OF THE INVENTION

Most commercial processes for the production of fuels and chemicals are designed to be continuous because continuity achieves high efficiency and high utilization of expensive capital intensive equipment. It is also desirable for fuel and chemical production processes to use solar energy as the source of heat because solar energy is both plentiful and inexpensive. However, the sun does not supply either a continuous or a uniform amount of energy. Energy levels are reduced or eliminated as a result of cloud cover and normal solar diurnal variation caused by the earth's rotation. Therefore, for solar energy to be effectively used for the production of fuels or chemicals, commercial processes utilizing solar energy must compensate for the intermittent reduction in energy.

There are a variety of ways of compensating for intermittent energy reduction. A heat transfer fluid may be stored at high temperatures and then used during nighttime or cloud cover to maintain the required conditions. Unfortunately, if the stored high temperature fluid is exhausted before the clouds disperse or during the night, the plant will shut down.

To permit more extended nighttime operation, hybrid systems consisting of a solar reactor and a fossil-fuel-fired reactor have been recommended. Such hybrid systems eliminate or reduce the need for heat-transfer fluid storage because the operation of both the solar reactor and the fossil-fuel-fired reactor is modulated to produce a constant net heat output. Thus, during times of peak solar energy, all heat is supplied by the sun. In contrast, at night, the fossil-fueled reactor operates at full load and the solar reactor shuts down. In this type of system, however, solar energy provides only about 30% of the energy requirements.

SUMMARY OF THE INVENTION

The present invention provides for greater solar contribution than the hybrid system without requiring large capacity heat-transfer fluid storage by linking complementary, endothermic and exothermic reactions. To be complementary the reactions must meet two criteria. First, the product produced in the endothermic reaction must be a reactant in the exothermic reaction. Second, the heat supplied by the reaction of a specific amount of the endothermic product in the exothermic reaction must exceed the energy required to create an equal amount of the endothermic product and produce a useful product.

Solar energy and the exothermic process supply the heat energy needed for the endothermic reaction. When direct solar energy is available (daytime), it provides the heat needed by the endothermic reaction. When direct solar energy is not available (nighttime or cloud cover), the exothermic process uses the solar derived energy, stored as chemical energy in the endothermic reaction product, to generate heat for the endothermic reaction and produce a useful product. The heat for the processes is transferred via a high temperature heat transfer loop, containing a heat transfer fluid, such as molten salt, which passes through both the reactors in which the endothermic and exothermic processes take place and a solar receiver.

An example of a suitable endothermic reaction is primary methane steam reforming. In this reaction, preheated methane and steam are reacted in a primary steam reformer to produce a synthesis gas consisting essentially of hydrogen and carbon monoxide. The synthesis gas is, after further treatment, converted to ammonia.

The burning of a portion of the ammonia in a conventional manner produced is a suitable complementary exothermic reaction. The products of ammonia combustion are nitric oxides which can be mixed with water and air to form nitric acid in a conventional manner.

During daylight, heat for the methane steam reforming process is provided by molten salt heated primarily in a solar receiver. A portion of the molten salt, cooled by the primary reforming reaction, is reheated by heat released from ammonia combustion. The remaining salt is returned to the solar receiver where it is also reheated. The reheated molten salt is returned to the methane reforming step. As the amount of available solar energy decreases, the amount of ammonia combusted is increased and a larger portion of the molten salt is diverted to the ammonia combustion reactor for heating to the temperature required for the steam reforming reaction. When no solar energy is available, the rate of ammonia combustion and subsequent nitric acid production is at its maximum and all of the molten salt is heated by this exothermic reaction. Conversely, as the available solar energy increases, the amount of ammonia supplied to the exothermic reaction decreases as does the amount of salt heated by the reaction. In short, the ammonia burner operates at a rate that is inversely proportional to the amount of directly available solar energy.

More specifically, the present invention relates to a method of using solar energy in a chemical synthesis process which comprises heating a first portion of heat transfer fluid in a solar receiver, heating a second portion of the heat transfer fluid by the ammonia combustion reaction utilizing the first and second portions of the heat transfer fluid to provide the heat required by the hydrocarbon steam reforming or carbonaceous fuel gasification reaction that is complementary to the ammonia combustion reaction, and returning to the high temperature ammonia combustion reactor at least a portion of the heat transfer fluid utilized to provide the heat for hydrocarbon steam reforming or carbonaceous fuel gasification. In particular, the present invention relates to a method of using solar energy in a chemical synthesis process which comprises heating molten salt in a solar receiver and with heat generated by an ammonia combustion process, utilizing the hot molten salt to provide the heat needed by a methane steam reforming process, said ammonia combustion using at least a portion of the ammonia produced from the methane steam reforming as a reactant.

DESCRIPTION OF THE INVENTION

Figure 1:
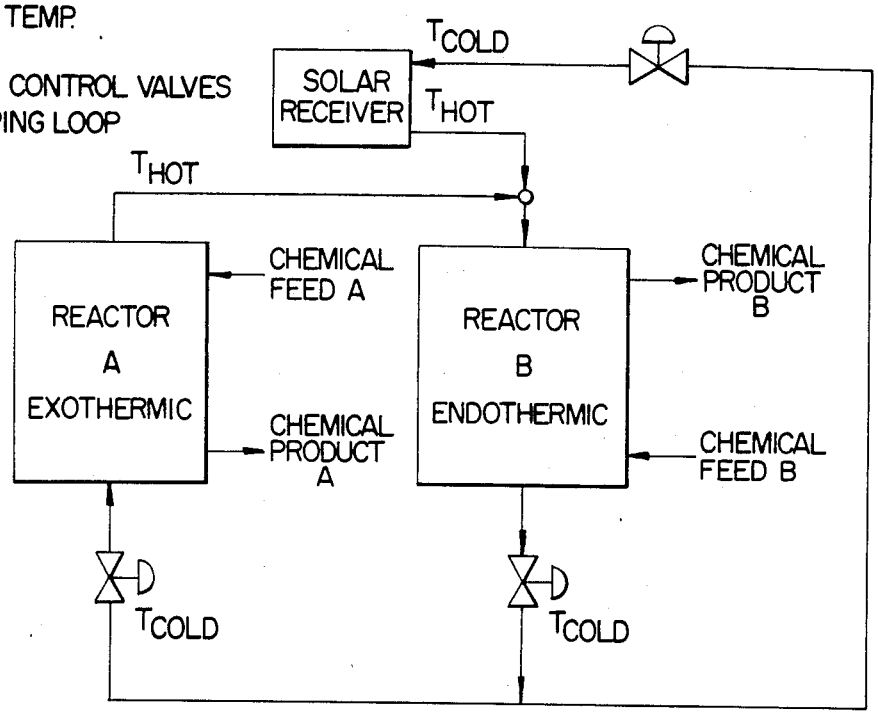
FIG. 1 is a general process schematic of the present invention. System components are represented as blocks, with interconnecting lines to show the high-temperature heat-transfer loop containing molten salt.

As shown in FIG. 1, the invention includes three thermally active components, a solar receiver and two reactors. The solar receiver and Reactor A, in which the exothermic reaction occurs, provide heat utilized in the endothermic reaction that occurs in Reactor B. During the day, the heat transfer fluid is heated primarily in the solar receiver to provide heat for the endothermic reaction. At nighttime, or during cloud cover, the necessary heat is provided by the exothermic reaction occurring in Reactor A. Reactor A changes load during the day (100 percent to some minimum value based on equipment capabilities) to accommodate variations in the heat provided by solar energy to the solar receiver.

In a preferred embodiment, high-temperature heat-transfer fluid, for example molten salt that is heated in a solar receiver during the day and heated by energy from ammonia combustion in Reactor A at night and during cloud cover, transfers heat to a primary steam reformer (Reactor B). Preheated methane and steam are reacted in the reformer to produce synthesis gas (syngas) consisting essentially of hydrogen and carbon monoxide. The syngas is treated in a conventional manner and is ultimately converted to ammonia.

A portion of the ammonia produced is mixed with air and combusted in the ammonia burner (Reactor A) to form nitric oxides. The nitric oxides are treated in a conventional manner to produce nitric acid. The remainder of the ammonia is stored. The heat released by the ammonia combustion is used to heat the molten salt cooled by the reforming process. The reheated molten salt is returned to Reactor B and provides heat for the reforming process.

Since the solar receiver varies in output from no load at night to full load at noon, the ammonia burner must compensate for the change in solar receiver output to achieve a constant supply of heat for the endothermic reaction occuring in Reactor B. This is accomplished by varying the fuel firing rate of the burner and the salt flow rate to the burner. Ammonia burner firing may be continuously varied in response to decreasing salt flow, with the firing controlled to maintain a constant salt ammonia burner outlet temperature. Thus, while the operation of the ammonia burner and the nitric acid plant is continuous, it varies in output with the availability of solar heat. At night, the ammonia burner operates at full load. During daylight, when the salt is heated primarily in the solar receiver, the ammonia burner will operate at less than full load, the specific percentage depending upon the amount of solar energy available. For example, at noon when the greatest amount of solar energy is available, the molten salt ammonia burner firing rate is at the burner's lowest practical turndown ratio. While the ammonia burner can, theoretically, be shut down near the noon solar peak, to shut down and start up the plant each day would be completely impractical. The firing rate will obviously be higher during the winter months. Various combinations of day to night and seasonal ammonia plant turn down and nitric acid turndown are apparent to those skilled in the art.

The nitric oxides produced in the ammonia burner are mixed with water and air to form nitric acid according to conventional nitric acid chemistry. Because the reactions involved are basic building blocks of many compounds, the ammonia, nitric acid and syngas can be further processed in conventional equipment to form among other products, ammonium nitrate, urea, hydrogen and methanol.

Figure 2:
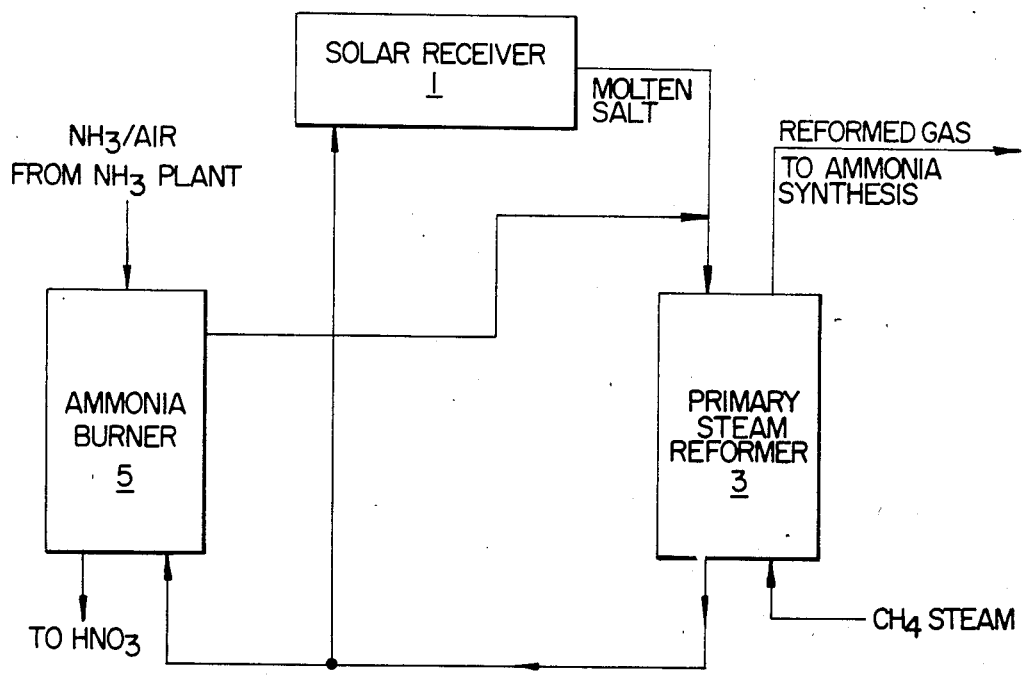
FIG. 2 is a schematic of the present invention wherein the endothermic reaction is methane steam reforming and the exothermic reaction is ammonia burning.

FIG. 2 is a schematic of the above-described process. The solar receiver 1 heats the molten salt during the day to a temperature of from about 1500° F. to about 2000° F. The increased heat provides the heat for the methane steam reforming process in the primary steam reformer 3. Preheated methane, at a temperature of from about 800° F. to about 1000° F., and steam are reacted in the primary steam reformer, producing synthesis gas at a temperature of from about 1300° F. to about 1800° F. The reaction cools the molten salt to a temperature of from about 900° F. to about 1100° F. When maximum solar energy is available, about 20 to about 30% of the cooled molten salt is heated by the exothermic ammonia combustion occurring in reactor 5. The ammonia produced from the reformed gas is introduced into the ammonia burner at a temperature of from about 300° F. to about 400° F. where it is combusted with air, thereby releasing heat to the molten salt, and in turn raising the temperature of the molten salt to from about 1500° F. to about 2000° F. The heated molten salt is then returned to the primary steam reformer to provide heat for the endothermic process. The products of combustion of the ammonia and oxides of nitrogen are contacted with water and air in a conventional manner to produce nitric acid.

Figure 3:
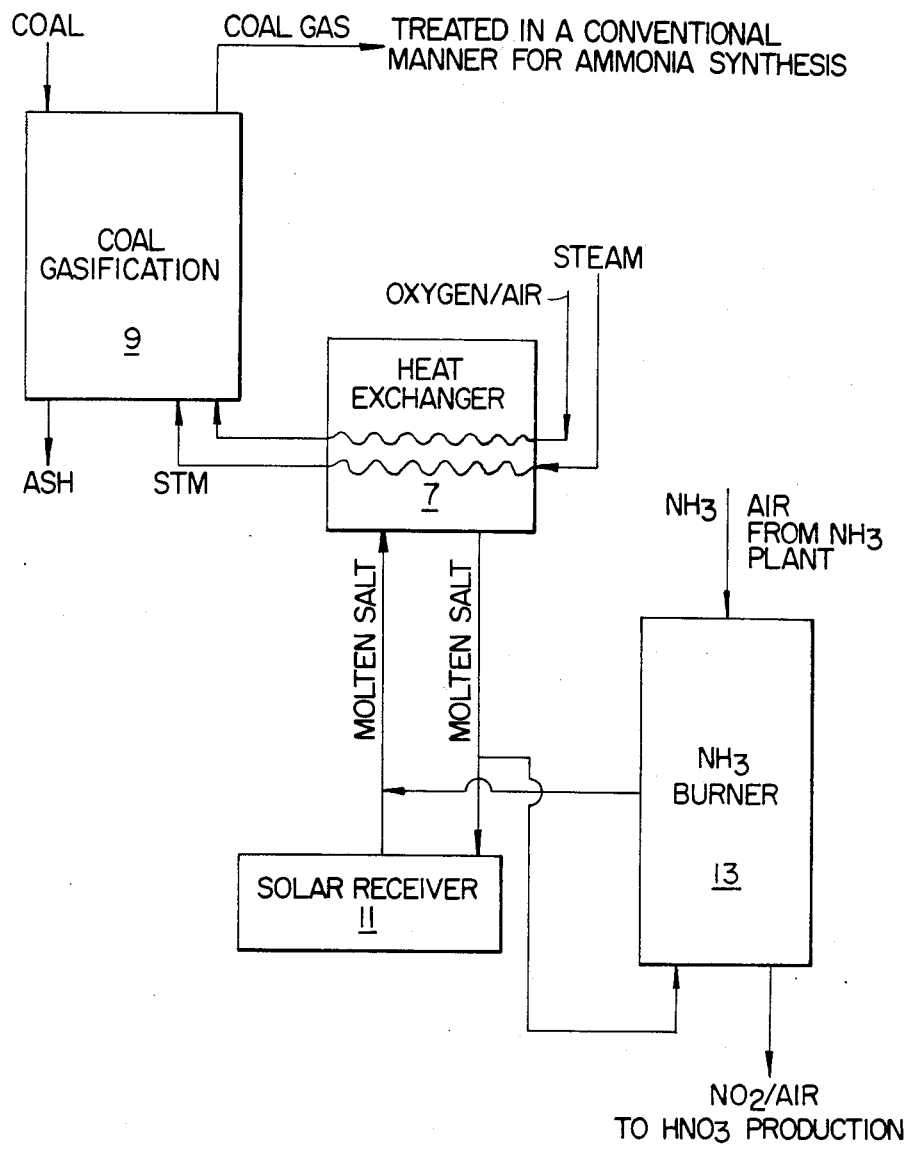
FIG. 3 is a schematic of the present invention wherein the endothermic reaction is coal gasification and the exothermic reaction is ammonia burning.

FIG. 3 is a schematic of a process in which coal gasification is used as the endothermic reaction in place of primary steam reforming. Steam and air are heated in a heat exchanger 7 producing steam at a temperature of from about 1300° F. to about 1500° F. The oxygen and steam provide the heat and the hydrogen needed for coal gasification that occurs in gasifier 9. The coal gas produced in the gasifier 9 may be treated in any conventional manner to be prepared for ammonia synthesis. The molten salt is heated in the solar receiver 11 or the ammonia burner 13 in the same manner as discussed above with respect to the methane steam reforming process.

High-temperature operation of the endothermic and exothermic processes results in the most effective use of energy for the invention. Therefore, it is preferred that the ammonia burner operate at a temperature of about 1800° F. and that the steam reforminq operate at a temperature of about 1600° F. However, technical difficulties at high temperatures (e.g., materials of construction problems) may necessitate that the processes operate at a lower (less efficient) temperature to be technically feasible. In accordance with the invention, the ammonia burner can operate at temperatures between about 2000° F. and about 1500° F. and corresponding primary steam reformer can operate between about 1800° F. and about 1400° F.

In order to achieve the preferred reaction temperatures, the maximum temperature of the molten salt in the heat transfer loop must be between about 1700° F. to about 1500° F. Since the endothermic reaction will cool the salt to a temperature of between about 900° F. and 1100° F., sufficient solar energy and heat from the exothermic reaction must be generated to heat the molten salt at least about 400° F.

In order to avoid dissociation of the molten salt at these elevated preferred temperatures, an eutectic mixture of carbonate salts (43.5 mol % lithium carbonate, 31.5 mol % sodium carbonate, and 25.0 mol % potassium carbonate) is preferred. This eutectic mixture melts at 397° C. (747° F.) and is stable to almost 1093° C. (2000° F.). Those skilled in the art will be able to select other salt formulations or metals such as sodium or lithium that are suitable for these operating temperatures. The molten salt is preferably blackened to enhance the absorptivity of the salt film by adding suitable materials (such as iron, nickel, and cobalt oxides).

Figure 4:
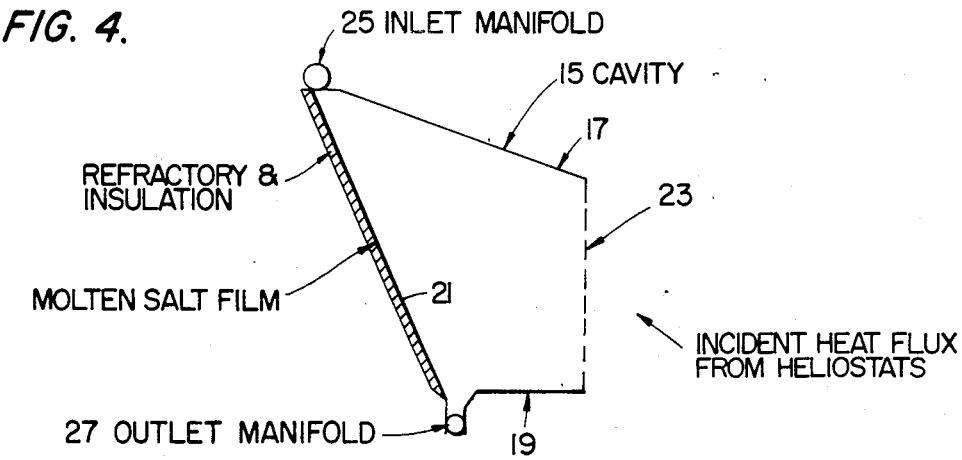
FIG. 4 is a schematic of a proposed solar receiver.

Although the endothermic and exothermic reactions utilized in the invention are conventional, the high operating temperatures and use of molten salt may require that specially designed equipment be employed. For example, in order to heat molten salt to a temperature of about 2000° F., a direct absorption cavity solar receiver should be used. A schematic of this type of a receiver is shown in FIG. 4. The receiver comprises a cavity 15 having upper and lower walls 17 and 19, an inclined rear wall 21, and a front aperture 23. An inlet manifold 25 is provided at the top of the inclined rear wall. An outlet manifold 27 is provided at the bottom of the wall. The active heating walls are lined with refractory materials and the cavity is fully insulated to reduce heat loss. Molten salt is introduced into the inlet manifold 25 and flows down and over the inclined rear wall 21 of the cavity 15 as a film where it is heated by the incident flux from heliostats. The heated molten salt exits the cavity through the outlet manifold 27 and is circulated to the endothermic reactor.

Figure 5:
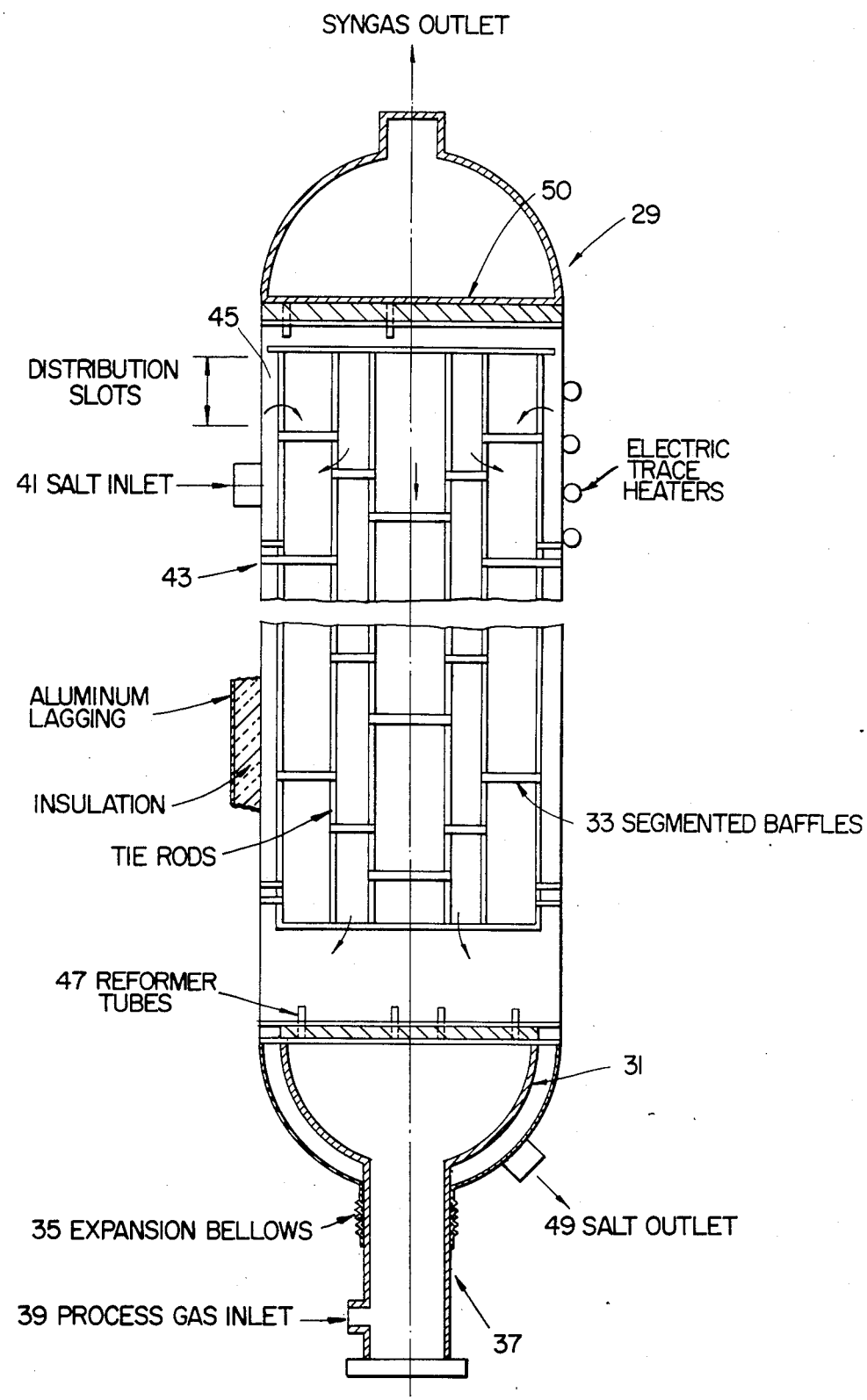
FIG. 5 illustrates a molten salt steam reformer.

FIG. 5 illustrates a suitable design for a primary steam reformer heated by molten salt. The steam reformer 29 has a single-pass, shell and tube counterflow configuration. The reformer has a floating head 31 and triple segmented baffles 33. Expansion bellows 35 welded to the lower shell head 37 and the process gas inlet nozzle 39 permits differential thermal expansion between the tube bundle and the shell.

Hot salt enters the nozzle 41 in the exchanger shell 43 and flows through the distribution slots 45 and contacts the reformer tubes 47. The cooled salt leaves the reactor through salt outlet 49. Process gas enters at 39, passes through the heat exchanger in a plurality of reformer tubes 47, and leaves through vertically centered nozzles in the shell head 50. The reformer tubes are packed with catalyst used in conventional primary steam reforming processes. Because of the molten salt, the reactor must be fabricated from molten salt resistant alloys such as inconel or incoloy.

The design of the ammonia burner for the exothermic ammonia combustion process is similar to the conventional units used in nitric acid plants, with molten salt rather than water/steam circulating through the high-temperature section of the unit.

Since ammonia is fired in both the ammonia burner of the present invention and a conventional ammonia burner, combustion gas flow rates, furnace volumes, and gas cross-sectional flow areas will be similar. As in the conventional ammonia burners, flue-gas-side conditions will control the sizing of the tube surface in the molten salt ammonia burner. In addition, since the molten salt ammonia burner will be using the same flue gas as the conventional ammonia burner, gas emissivities will be identical. However, since outside tubewall temperatures will be higher in the ammonia burner because of the hotter molten salt flowing inside the tubes, the radiation heat-transfer coefficient of the outside tubes will be smaller in the molten salt ammonia burner, increasing heat-transfer area requirements.

Most importantly, since molten salt flows inside the tubes, tubewall temperatures will be higher than those experienced in a conventional water/steam ammonia burner by as much as 278° C. (500° F.). Therefore, high temperature materials, such as inconel or incoloy, must be used for the tube.

Cycling duty requirements of the molten salt burner also differ from those of a conventional burner. Conventional ammonia burners are designed for steady-state operation 24 hours a day, 7 days a week, while the ammonia burner firing rate in the present invention will vary from full load at night to from about 20% to 30% at noon. Operation and control of the unit should be designed to minimize metal temperature variations as done in conventional utility boilers for power plants. Ammonia burner firing should be controlled to maintain a constant salt outlet temperature, thus minimizing changes in metal temperature.

Figure 6:
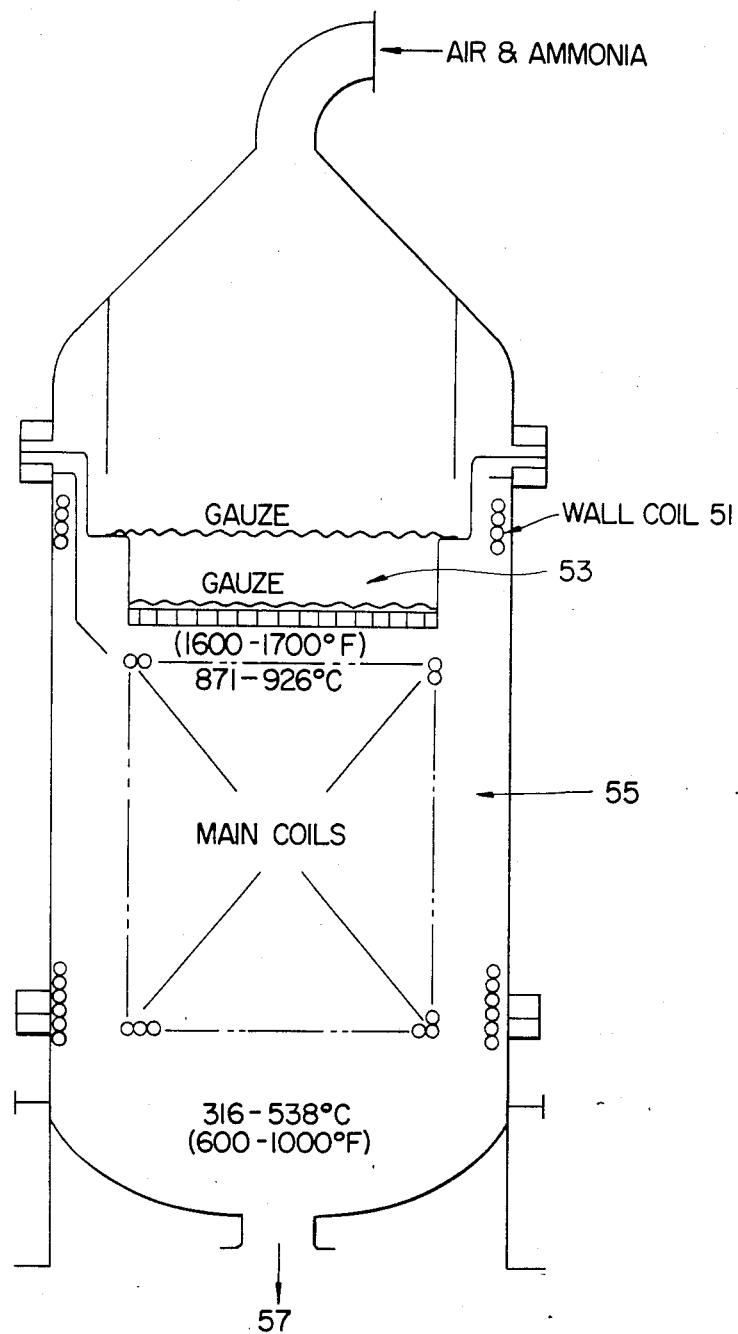
FIG. 6 illustrates a molten salt ammonia burner.

A suitable molten salt ammonia burner is shown in FIG. 6. The walls of the unit are made with coiled tubes 51 to form a molten-salt-cooled boundary. Ammonia gas is catalytically combusted with air in the catalyst basket 53 at the top of the vessel. The $NO_x$ product gases flow downward from this section and enter the heat recovery area 55, where the combustion heat is transferred to the molten salt. Since convection is the dominant means of heat transfer in the heat recovery area, relatively closely spaced tubes are used. The cooled $NO_x$ gases continue downward and leave the ammonia burner vessel 57. Residual heat remaining in the $NO_x$ gases can be used in a conventional manner to supply heat for related processes.

What is claimed is:

1. A method of using solar energy in a chemical synthesis process comprising:
    (a) steam reforming hydrocarbons or gasifying carbonaceous fuels;
    (b) converting the product of said steam reforming of hydrocarbons of said gasifying of carbonaceous fuels to an ammonia synthesis gas;
    (c) converting said ammonia synthesis gas to ammonia;
    (d) supplying the heat required for said steam reforming of hydrocarbons or said gasifying of carbonaceous fuels by a heat transfer fluid;
    (e) heating said heat transfer fluid in a solar receiver when solar energy is available;
    (f) heating said heat transfer fluid by combusting a portion of said ammonia when sufficient solar energy is not available to supply the necessary heat to said heat tranfer fluid wherein the product of said combusting of said ammonia is nitric oxides and said nitric oxides are combined with air and used to produce nitric acid.

2. The method of claim 1 wherein said heat transfer fluid is molten salt.

3. The method of claim 1 wherein said heat transfer fluid is molten sodium.

4. The method of claim 1 wherein said heat transfer fluid is molten lithium.

5. The method of claim 1 wherein said heat transfer fluid is heated in said solar receiver during the day and said heat transfer fluid is heated by combusting a portion of said ammonia during nighttime or cloud cover.

6. The method of claims 1, 2, 3 or 4 wherein said heat tranfer fluid is heated to a temperature of from about 1500° F. to about 2000° F. in said solar receiver.

7. The method of claims 1, 2, 3 or 4 wherein said combusting of said ammonia raises the temperature of said heat transfer fluid from about 1500° F. to about 2000° F.

* * * * *

UNITED STATES PATENT AND TRADEMARK OFFICE
CERTIFICATE OF CORRECTION

PATENT NO. : 4,668,494

DATED : May 26, 1987

INVENTOR(S) : James P. Van Hook, Basking Ridge, N.J.; David H. Dietz, Livingston, N.J.

It is certified that error appears in the above-identified patent and that said Letters Patent is hereby corrected as shown below:

On the title page

Delete the inventorship line, which reads:

"[75] Inventor: James P. Van Hook, Basking Ridge, N.J."

and insert therefor:

--[75] Inventors: James P. Van Hook, Basking Ridge; David H. Dietz, Livingston, both of New Jersey--.

Signed and Sealed this

Twenty-eighth Day of February, 1989

Attest:

DONALD J. QUIGG

Attesting Officer

Commissioner of Patents and Trademarks